United States Patent
De Pinto et al.

(10) Patent No.: US 12,528,452 B2
(45) Date of Patent: Jan. 20, 2026

(54) VEHICLE DYNAMICS SYSTEM ADJUSTMENT

(71) Applicant: McLaren Automotive Limited, Woking (GB)

(72) Inventors: Stefano De Pinto, Barcelona (ES); Aldo Sorniotti, Turin (IT)

(73) Assignee: McLaren Automotive Limited, Woking (GB)

(*) Notice: Subject to any disclaimer, the term of this patent is extended or adjusted under 35 U.S.C. 154(b) by 148 days.

(21) Appl. No.: 18/383,446

(22) Filed: Oct. 24, 2023

(65) Prior Publication Data
US 2024/0132053 A1    Apr. 25, 2024
US 2024/0227781 A9    Jul. 11, 2024

(30) Foreign Application Priority Data

Oct. 25, 2022 (GB) .................... 2215775

(51) Int. Cl.
*B60W 30/04* (2006.01)
*B60W 10/20* (2006.01)
(Continued)

(52) U.S. Cl.
CPC .......... *B60W 30/04* (2013.01); *B60W 10/20* (2013.01); *B60W 10/22* (2013.01);
(Continued)

(58) Field of Classification Search
CPC ...... B60W 30/04; B60W 10/20; B60W 10/22; B60W 40/064; B60W 40/112;
(Continued)

(56) References Cited

U.S. PATENT DOCUMENTS 9,937,908 B2   4/2018  Morgan et al.
10,821,981 B1  11/2020 Funke et al.
(Continued)

FOREIGN PATENT DOCUMENTS

CN    114375269    4/2022
EP    1729984     12/2010
(Continued)

OTHER PUBLICATIONS

Partial European Search Report in European Appln. No. 23205850.3, mailed on Mar. 6, 2024, 15 pages.
(Continued)

*Primary Examiner* — Yi-Kai Wang
(74) *Attorney, Agent, or Firm* — Fish & Richardson P.C.

(57) ABSTRACT

A method for adjusting one or more vehicle dynamics systems of a vehicle, the vehicle comprising a road wheel and at least one vehicle sensor configured to provide vehicle condition data, the road wheel comprising a tyre sensor configured to output tyre operation data, the method comprising: receiving tyre operation data from the tyre sensor; receiving vehicle condition data from at least one vehicle sensor; calculating one or more vehicle dynamics parameters based on the vehicle condition data and the tyre operation data; and adjusting one or more vehicle dynamics systems in response to the calculated one or more vehicle dynamics parameters.

21 Claims, 3 Drawing Sheets

(51) Int. Cl.
*B60W 10/22* (2006.01)
*B60W 40/064* (2012.01)
*B60W 40/112* (2012.01)
*B60W 50/00* (2006.01)

(52) U.S. Cl.
CPC ........ *B60W 40/064* (2013.01); *B60W 40/112* (2013.01); *B60W 2030/043* (2013.01); *B60W 2050/0088* (2013.01); *B60W 2530/20* (2013.01); *B60W 2720/20* (2013.01); *B60W 2720/30* (2013.01)

(58) Field of Classification Search
CPC ... B60W 2030/043; B60W 2050/0088; B60W 2530/20; B60W 2720/20; B60W 2720/30; B60W 40/068; B60C 23/02; B60G 17/0182; B60G 17/0195; B60G 2204/113; B60G 2300/27; B60G 2400/204; B60G 2400/208; B60G 2400/302; B60G 2400/38; B60G 2400/39; B60G 2400/52; B60G 2500/10; B60G 17/0162; B60G 2400/60; B60G 2400/90; B60G 2500/30; B60G 2800/01; B60G 2800/012; B60G 2800/21; B60G 2800/212; B60T 8/17554; B60T 2230/02; B60T 2260/06; B62D 37/02
USPC .......................................................... 701/38
See application file for complete search history.

(56) References Cited

U.S. PATENT DOCUMENTS

| | | |
|---|---|---|
| 2005/0033486 A1 | 2/2005 | Schmitt et al. |
| 2006/0190150 A1 | 8/2006 | Milot |
| 2008/0281487 A1* | 11/2008 | Milot .................... B60W 30/04 701/1 |
| 2017/0080908 A1* | 3/2017 | Morgan .................. B60T 8/171 |
| 2020/0033137 A1 | 1/2020 | Hartmann et al. |
| 2021/0139028 A1 | 5/2021 | Zhou et al. |

FOREIGN PATENT DOCUMENTS

| | | |
|---|---|---|
| EP | 2778631 | 9/2014 |
| JP | H07-186928 | 7/1995 |
| WO | WO 2010/117793 | 10/2010 |
| WO | WO 2015/153811 | 10/2015 |
| WO | WO 2022/108603 | 5/2022 |

OTHER PUBLICATIONS

Extended European Search Report in European Appln. No. 23205850.3, mailed on Jun. 20, 2024, 18 pages.

Search Report in United Kingdom Appln. No. 2215775.4, mailed on Apr. 18, 2023, 4 pages.

* cited by examiner

VEHICLE DYNAMICS SYSTEM ADJUSTMENT

CROSS-REFERENCE TO RELATED APPLICATIONS

This application claims priority GB Patent Application Serial No. 2215775.4, filed on Oct. 25, 2022, the entire contents of which are hereby incorporated by reference.

FIELD OF THE INVENTION

This invention relates to a method for adjusting one or more vehicle dynamics systems of a vehicle.

BACKGROUND

Vehicles comprise a plurality of systems that need to be controlled for the optimum performance of the vehicle. This is especially true in high performance vehicles where even minor improvements in the control of the vehicle can lead to a level of improvement in performance that is useful. Inputs are taken from a variety sources throughout the vehicle. Decisions are then made by control procedures located in the vehicle as to how to control systems comprised within the vehicle. These systems may be vehicle dynamics systems which control components of the vehicle such as the engine or brakes.

The decisions that are taken are based on estimates of the performance of the vehicle at a given point. These estimates are dependent on the inputs taken from a variety of sources throughout the vehicle. It would be desirable to improve the estimates of the performance of the vehicle so that these can feed through into improvements in the control of the vehicle.

SUMMARY

According to a first aspect of the present invention there is provided a method for adjusting one or more vehicle dynamics systems of a vehicle, the vehicle comprising a road wheel and at least one vehicle sensor configured to provide vehicle condition data, the road wheel comprising a tyre sensor configured to output tyre operation data, the method comprising: receiving tyre operation data from the tyre sensor; receiving vehicle condition data from at least one vehicle sensor; calculating one or more vehicle dynamics parameters based on the vehicle condition data and the tyre operation data; and adjusting one or more vehicle dynamics systems in response to the calculated one or more vehicle dynamics parameters.

The tyre operation data may comprise contact patch longitudinal load. The tyre operation data may comprise contact patch radial load. The tyre operation data may comprise a tyre identifier. The tyre operation data may comprise contact patch deflection.

Calculating one or more vehicle dynamics parameters based on the vehicle condition data and the tyre operation data may comprise calculating one or more vehicle dynamics parameters based on the vehicle condition data, historic vehicle condition data and the tyre operation data. Adjusting one or more vehicle dynamics systems in response to the calculated one or more vehicle dynamics parameters may comprise adjusting one or more vehicle dynamics systems in response to the calculated one or more vehicle dynamics parameters and historic vehicle dynamics parameters. The vehicle dynamics systems may comprise a vehicle ride height system and adjusting one or more vehicle dynamics systems may comprise adjusting the vehicle ride height system to change a ride height of the vehicle.

Calculating one or more vehicle dynamics parameters may comprise calculating an aerodynamic load of the vehicle based on the contact patch longitudinal load and contact patch radial load; and the vehicle dynamics systems may comprise a vehicle ride height system and adjusting one or more vehicle dynamics systems may comprise adjusting the vehicle ride height system to change a ride height of the vehicle based on the aerodynamic load. The vehicle dynamics systems may comprise a stability control system, and adjusting one or more vehicle dynamics systems may comprise adjusting the stability control system to cause at least some controllable linkages in a suspension system of the vehicle to operate to counter vehicle roll.

Vehicle condition data may describe a load on the body of the vehicle; calculating one or more vehicle dynamics parameters may comprise calculating a sideslip angle based on the contact patch longitudinal load, contact patch deflection and the vehicle condition data; and the vehicle dynamics systems may comprise a stability control system, and adjusting one or more dynamics systems may comprise adjusting the stability control system to cause at least some controllable linkages in a suspension system of the vehicle to operate to counter vehicle roll based on the side slip angle.

The vehicle dynamics systems may comprise a torque vectoring control system, and adjusting one or more dynamics systems may comprise adjusting the torque vectoring control system to cause a steering effect using torque vectoring. Vehicle condition data may describe a load on the body of the vehicle; calculating one or more vehicle dynamics parameters may comprise calculating a sideslip angle based on the contact patch longitudinal load, contact patch deflection and the vehicle condition data; the vehicle dynamics systems may comprise a torque vectoring control system; and adjusting one or more dynamics systems may comprise adjusting the torque vectoring control system to cause a steering effect using torque vectoring to counter the sideslip angle.

The vehicle condition data may indicate a current wheel speed of the wheel; calculating one or more vehicle dynamics parameters may comprise calculating a current vehicle speed based on the vehicle condition data that indicates the current wheel speed of the wheel and the tyre identifier; the vehicle dynamics systems may comprise a torque vectoring control system; and adjusting one or more dynamics systems may comprise adjusting the torque vectoring control system based on the current vehicle speed. The vehicle condition data may indicate a current wheel speed of the wheel; calculating one or more vehicle dynamics parameters may comprise calculating a maximum road friction coefficient based on the vehicle condition data that indicates the current wheel speed of the wheel, the contact patch longitudinal load, the contact patch radial load, and the contact patch deflection; the vehicle dynamics systems may comprise a torque vectoring control system; and adjusting one or more dynamics systems may comprise adjusting the torque vectoring control system based on the maximum road friction coefficient.

The vehicle dynamics systems may comprise an active aero control system; and adjusting one or more vehicle dynamics systems may comprise adjusting the active aero control system to change downforce provided by active aerodynamic devices. The vehicle condition data may indicate a current wheel speed of the wheel; calculating one or more vehicle dynamics parameters may comprise calculating a current vehicle speed based on the vehicle condition data that indicates the current wheel speed of the wheel and the tyre identifier and calculating an aerodynamic load of the vehicle based on the contact patch longitudinal load and contact patch radial load; the vehicle dynamics systems comprise an active aero control system; and adjusting one or more dynamics systems may comprise adjusting the active aero control system based on the current vehicle speed and the tyre identifier.

The vehicle dynamics systems may comprise a traction control system; and adjusting one or more vehicle dynamics systems may comprise adjusting the traction control system to control a torque provided to the wheel. The vehicle condition data may indicate a current wheel speed of the wheel; calculating one or more vehicle dynamics parameters may comprise calculating a maximum road friction coefficient based on the vehicle condition data that indicates the current wheel speed of the wheel, the contact patch longitudinal load, the contact patch radial load, and the contact patch deflection; the vehicle condition data may indicate a current wheel speed of the wheel; calculating one or more vehicle dynamics parameters may comprise calculating a current vehicle speed based on the vehicle condition data that indicates the current wheel speed of the wheel and the tyre identifier; the vehicle dynamics systems may comprise a traction control system; and adjusting one or more vehicle dynamics systems may comprise adjusting the traction control system based on the maximum road friction coefficient and current vehicle speed to control a torque provided to the wheel.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for adjusting one or more vehicle dynamics systems of a vehicle, the vehicle comprising a road wheel and at least one vehicle sensor configured to provide vehicle condition data, the road wheel comprising a tyre sensor configured to output tyre operation data. The method comprises receiving tyre operation data from the tyre sensor; and receiving vehicle condition data from at least one vehicle sensor. The method further comprises calculating one or more vehicle dynamics parameters based on the vehicle condition data and the tyre operation data; and adjusting one or more vehicle dynamics systems in response to the calculated one or more vehicle dynamics parameters.

Figure 1:
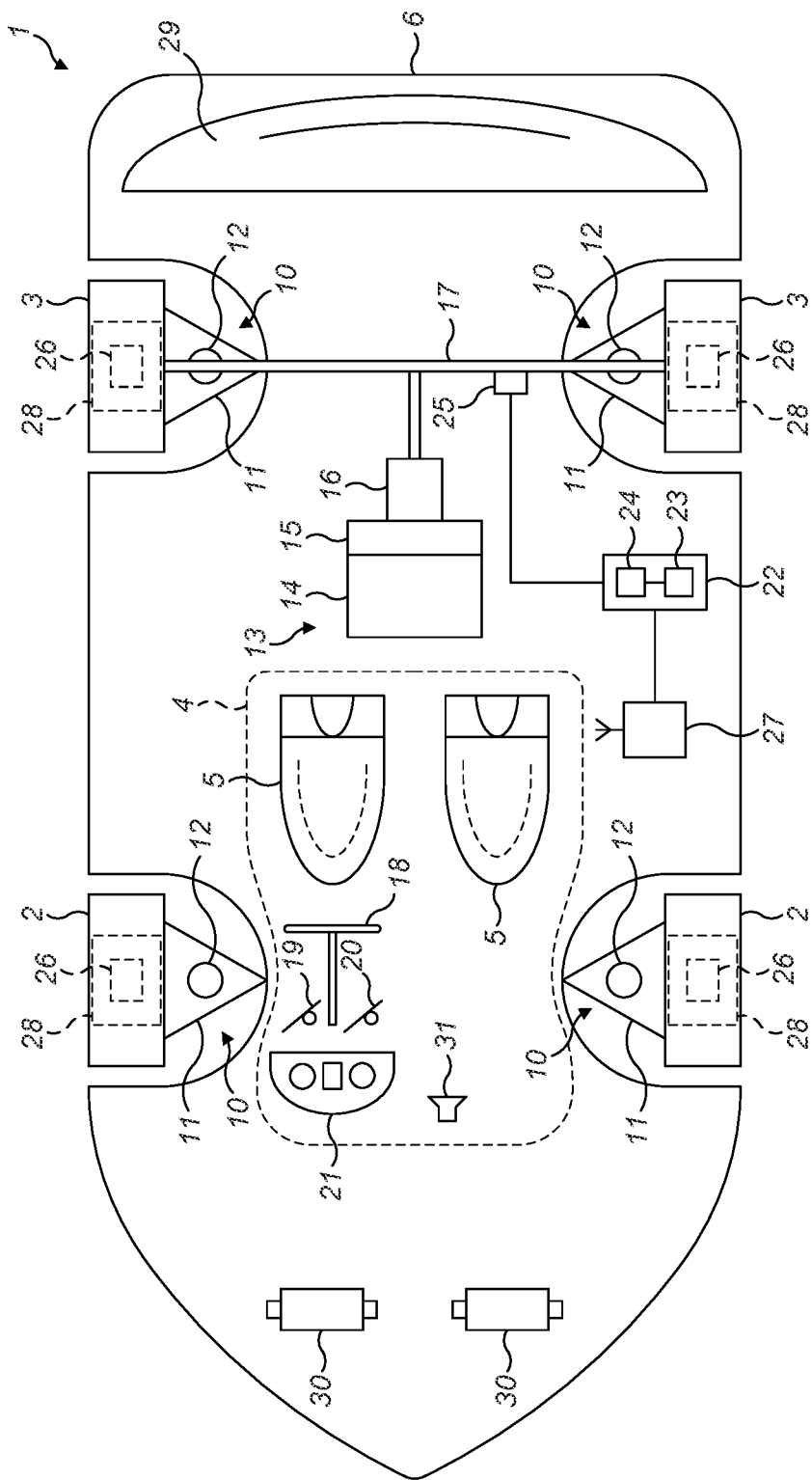
FIG. 1 shows a schematic plan of a vehicle.

FIG. 1 shows a vehicle 1. FIG. 1 shows a plan schematic view of the vehicle 1. The vehicle may be an automobile. The vehicle 1 may be a car. The vehicle comprises front wheels 2 and rear wheels 3. The wheels 2, 3 are road wheels. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment may accommodate a driver. The occupant compartment may accommodate one or more passengers.

The vehicle comprises a vehicle body 6. The vehicle body 6 generally comprises a plurality of body panels together with the underlying structure that supports components of the vehicle 1.

Figure 2:
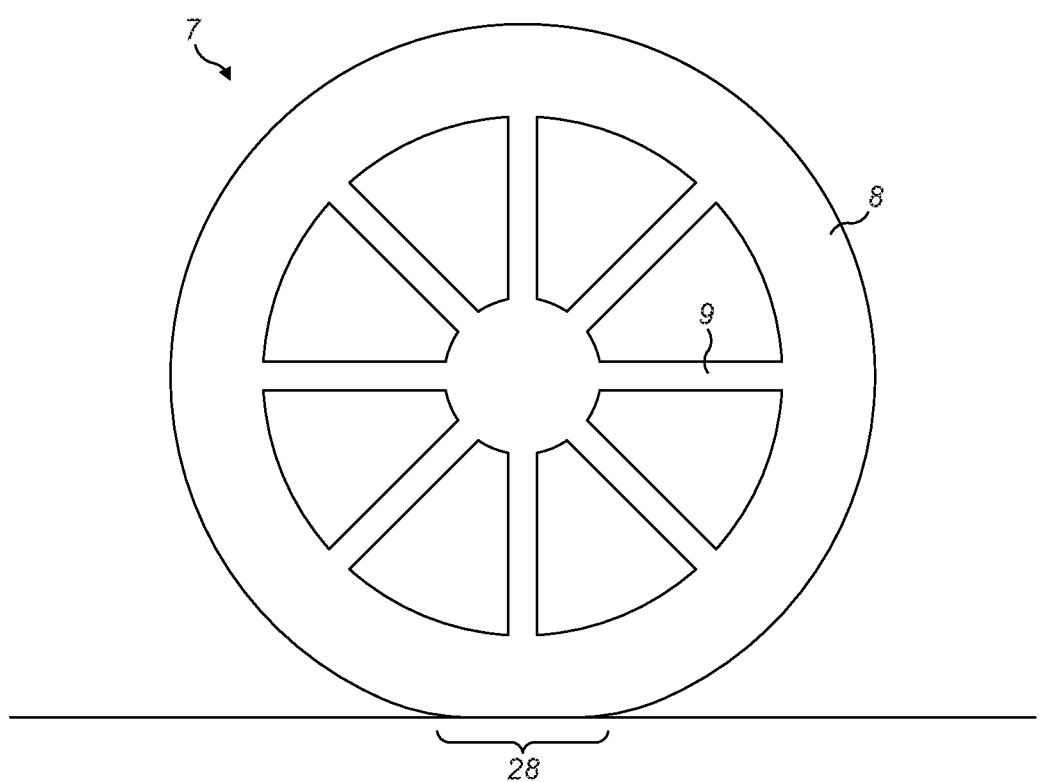
FIG. 2 shows a side view of an example wheel.

The wheels 2, 3 are mounted to the vehicle body 6 so that they can rotate and translate relative to the vehicle body 6. The wheels 2, 3 support the vehicle 1 on a running surface such as a road. In this way, the wheels 2, 3 are road wheels. FIG. 2 shows a side view of an example wheel 7 that may be any of the front or rear wheels 2, 3. The wheel 7 comprises a tyre 8 and a wheel rim 9 to which the tyre 8 is fitted. The wheel rim 9 is configured so that it can be secured to the rest of the vehicle 1. For instance, the wheels 2, 3 are mounted on hub carriers. Thus, each wheel rim 9 is mounted on a hub carrier.

Each wheel can rotate relative to its respective hub carrier about a generally horizontal axis. This rotation axis may be known as the respective rolling axis of the respective wheel 2, 3. The wheels rotate about their respective rolling axes as the vehicle moves along a surface such as the ground due to the wheels contacting the ground and supporting the body of the vehicle against the ground. Each hub carrier is mounted to the body 6 of the vehicle 1 by a suspension mechanism indicated generally at 10. At least some of the wheels may be steerable wheels. The vehicle may comprise a pair of steerable wheels. The steerable wheels may be the front wheels 2. The suspension mechanisms 10 of the steerable wheels 2 are mounted to the hub carriers in such a way that each hub carrier can rotate about a respective steer axis. This thus causes the rolling axis of the wheel that is being steered to rotate about the steer axis.

The suspension mechanism 10 may comprise linkages 11 to connect the hub carrier to the vehicle body 6. The suspension mechanism 10 may comprise one or more suspension components 12 such as springs and/or dampers. The suspension components 12 may provide forces to the linkages 11 to control the motion and/or position of the linkages 11. In this way, the motion and/or position of the wheels 2, 3 relative to the vehicle body 6 can be controlled.

The vehicle 1 comprises a powertrain shown generally at 13. The powertrain 13 may comprise an internal combustion engine 14. The powertrain 13 may comprise one or more electric motors 15. The powertrain 13 may comprise one or more gearboxes 16 to adjust the rotational speed of the internal combustion engine 14 and/or the electric motor(s) 15. The powertrain 13 may be connected to one or more of the wheels 2, 3 by one or more drive shafts 17. In this way the powertrain 13 can drive one or more of the wheels 2, 3. The powertrain 13 may be formed of multiple separate units, each unit driving one or more of the wheels 2, 3. For instance, separate electric motors may individually drive the front wheels 2. In another example, an internal combustion engine 14 may drive the rear wheels 3 optionally with the assistance of one or more electric motors 15. These examples may be combined together. It will be appreciated that there are multiple configurations of powertrain units that may be present in a vehicle 1.

The vehicle 1 may comprise controls located within the occupant compartment 4 to enable an occupant to control the motion of the vehicle 1. One of those controls may be a steering wheel 18. The steering attitude of the wheels 2 is controlled by the steering wheel 18. The steering wheel 18 may be connected to the steered wheels 2 by a steering mechanism so that when the steering wheel 18 is rotated the steered wheels 2 rotate about their respective steer axis. Another of those controls may be a throttle pedal 19. The throttle pedal 19 enables an occupant to provide input on the required torque demanded from the powertrain 13. Generally, the further the throttle pedal 19 is depressed then the greater the torque demand from the driver. Another of those controls may be a brake pedal 20. The brake pedal 20 enables an occupant of to provide input on the braking force required by brakes that are attached to wheels 2, 3.

The vehicle 1 may comprise a display 21 which provides information to the occupants of the vehicle 1. The display 21 may also be referred to as a dashboard. The display 21 may display one or more instruments. The instruments providing information on the current status of the vehicle. For instance, how fast the vehicle is travelling, what gear the vehicle is in, and the speed of rotation of parts of the powertrain such as the internal combustion engine 14. The display 21 may also provide the occupants, and particularly the driver, with information on how to optimally control the vehicle in a given situation. For instance, the display 21 may indicate the optimal moment to change gear. The vehicle may comprise a speaker 31.

The operation of the vehicle is regulated by a Vehicle Control Unit (VCU) 22. The VCU 22 comprises a processor 23 and a non-volatile memory 24. The VCU 22 may comprise more than one processor 23 and more than one memory 24. The memory 24 stores a set of program instructions that are executable by the processor, and reference data such as look-up tables that can be referenced by the processor in response to those instructions. The processor 23 may be configured to operate in accordance with a computer program stored in non-transitory form on a machine readable storage medium. The computer program may store instructions for causing the processor to perform the operations of the VCU 22 in the manner described herein. The VCU 22 may be formed of a number of control units, such an Engine Control Unit, Power Source Control Unit, Gearbox Control Unit, and/or Suspension Control Unit. The VCU 22 is connected to various vehicle components to gather data about the operation of those components. The VCU 22 is connected to various vehicle components to provide control data to those components. The control data influencing the control of the relevant component.

The VCU 22 is connected one or more vehicle sensors 25. The vehicle sensor(s) 25 each provide vehicle condition data. The vehicle condition data that the sensor 25 provides will be dependent on what the sensor 25 is sensing. The vehicle sensors may include:

A wheel speed sensor. The wheel speed sensor provides vehicle condition data that indicates the current wheel speed of the wheel the sensor is associated with. There may be a separate respective wheel speed sensor associated with each wheel of the vehicle.

A gearbox gear sensor. The gearbox gear sensor provides vehicle condition data that indicates the current gear selected by the gearbox.

An engine revolution speed sensor. The engine revolution speed sensor providing vehicle condition data that indicates the current revolution speed of the engine.

A powertrain torque sensor. The powertrain torque sensor provides vehicle condition data that indicates the current output torque of the powertrain. There may be a separate powertrain torque sensor associated with each power source of the powertrain. For instance, a first powertrain torque sensor may be associated with the internal combustion engine and a second powertrain torque sensor may be associated with an electric motor that forms part of the powertrain. Each powertrain torque sensor provides vehicle condition data that indicates the current output torque of the respective power source.

A brake pressure sensor. The brake pressure sensor provides vehicle condition data that indicates the brake pressure of a brake associated with a wheel of the vehicle, There may be separate respective brake pressure sensors for each wheel of the vehicle.

A body force sensor. The body force sensor provides vehicle condition data on the load on the body of the vehicle. The body force sensor may provide vehicle condition data that indicates the lateral acceleration of the vehicle. The body force sensor may provide vehicle condition data that indicates the lateral acceleration of the vehicle. The body force sensor may provide vehicle condition data that indicates the longitudinal acceleration of the vehicle. The body force sensor may provide vehicle condition data that indicates the yaw of the vehicle. The body force sensor may provide more than one of these types of vehicle condition data. The body force sensor may provide all of these types of vehicle condition data. Alternatively, there may be more than one body force sensor which provides at least one of these types of vehicle condition data. The body force sensor may be in the form of an inertial measurement unit.

The VCU 22 controls one or more vehicle dynamics systems within the vehicle. The vehicle dynamics systems control elements of the operation of the vehicle. The vehicle dynamics systems control the operation of components of the vehicle. The vehicle dynamics systems are able to adjust the operation of components of the vehicle so that they operate in a particular way at a particular time. Each vehicle dynamics system may operate according to a respective set of predefined rules which define how the components under the control of the particular vehicle dynamics system operate. The vehicle dynamics systems may include:

A vehicle ride height system. The vehicle ride height system controls the suspension systems 10 of the wheels to adjust the ride height of the vehicle 1. The suspension systems 10 may comprise an adjustable damper is configured to alter its length to adjust the ride height of the vehicle 1. The ride height of the vehicle 1 may be the distance between the body of the vehicle and the running surface that the wheels rest on. The ride height of the vehicle 1 may be the average distance between the body of the vehicle and the running surface. This may be the case where the underside of the vehicle is not level with the running surface.

A stability control system. The stability control system controls the suspension system 10 of the wheels to counter movement of the body of the vehicle. The movement of the vehicle body may be relative to the wheels of the vehicle. The movement of the vehicle body may be caused by dynamic forces acting on the vehicle body during motion of the vehicle. The suspension system 10 may comprise one or more controllable linkages such as dampers. The stability control system may provide control signals to the controllable linkages to stabilise the vehicle at a given moment. The controllable linkages may be controlled to adjust the amount of resistance provided to the suspension system. The stability control system may control the controllable linkages to counter movement of the vehicle body.

A torque vectoring control system. The torque vectoring control system controls the powertrain 13 of the vehicle to provide difference in torque to two or more wheels of the vehicle to provide a steering effect to those wheels. The difference in torque may be generated by causing at least two of the power sources of the powertrain to output different torques at a given moment.

An active aero control system. The vehicle may comprise one or more active aerodynamic devices 29, 30. The aerodynamic devices 29, 30 may be in the form of one or more moveable wings such as a rear wing 29 as pictured in FIG. 1. The aerodynamic device 29, 30 may be in the form of one or more moveable flaps such as front flaps 30 as pictured in FIG. 1. The active aero control system provides inputs to the active aerodynamic devices 29, 30 to cause the active aerodynamic devices to adjust their aerodynamic performance.

A traction control system. The traction control system controls the powertrain 13, brakes and/or differential of the vehicle to control the interaction of the wheels of the vehicle with the running surface. The traction control system controls these vehicle component(s) to attempt to improve the traction between the wheels and the running surface.

The VCU 22 may make use of a Kalman filter to undertake its methods. The Kalman filter is used to predict the state of the vehicle using data received from the vehicle sensors. The VCU 22 controls the vehicle dynamics systems in response to the predicted state of the vehicle.

As described herein, the vehicle comprises a road wheel 2, 3. The road wheel comprises a tyre sensor 26. The tyre sensor 26 is located within the wheel 2, 3. Each wheel may have a tyre sensor 26 associated with it as shown in FIG. 1. The tyre sensor 26 communicates with a tyre sensor receiver 27. The tyre sensor receiver 27 communicates wirelessly with the tyre sensor(s) 26. The tyre sensor(s) are separate to the vehicle sensors.

The tyre sensor 26 analyses the motion of the wheel to generate tyre operation data associated with the wheel. The tyre sensor 26 may analyse the relative motion of the tyre 8 relative to the wheel rim 9 to generate the tyre operational data. The tyre sensor 26 may analyse the interior conditions of the wheel (i.e. the region enclosed by the tyre and the wheel rim) to generate tyre operation data. The tyre sensor 26 may analyse a contact patch 28 associated with the tyre 8 to generate tyre operation data. The contact patch 28 being the portion of the tyre 28 that is in contact with a running surface of the vehicle 1. The tyre sensor 26 may be encoded with a tyre identifier which is provided as tyre operational data. The tyre sensor receiver 27 may process the tyre operational data received from the tyre sensor 26 to translate the data into a form that is readable by the vehicle's systems, such as the VCU 22.

The tyre operation data that the tyre sensor 26 outputs may comprise one or more of the following types of tyre operation data:

Contact patch longitudinal load. The contact patch longitudinal load is the load in the longitudinal direction of the tyre that is being placed on the contact patch of the tyre due to the current operation of the vehicle. The vehicle body 6 via the suspension 10 puts load on to the tyres during movement of the vehicle 1. This load causes forces on the tyre which generate a load in the longitudinal direction of the wheel 2, 3 and hence the tyre.

Contact patch radial load. The contact patch radial load is the load in the radial direction of the tyre that is being placed on the contact patch of the tyre due to the current operation of the vehicle. The radial direction being a line that runs from the contact patch to the rotation axis of the wheel. When the vehicle is stationed on a flat horizontal running surface then the radial load operates in a vertical direction. The vehicle body 6 via the suspension 10 puts load on to the tyres during movement of the vehicle 1. This load causes forces on the tyre which generate a load in the radial direction of the wheel 2, 3 and hence the tyre.

A tyre identifier. The tyre identifier is an identifier for the tyre. It may provide the make and/or model of the tyre.

Current tyre pressure. The current tyre pressure is the air pressure present in the interior region of the tyre. I.e. the region enclosed by the tyre and the wheel rim.

Contact patch deflection. The contact patch deflection is the amount that the contact patch has moved from a normal position. The normal position being the position of the contact patch when the vehicle is stationary and thus under no load. The contact patch deflection is caused by load being put on the tyres during movement of the vehicle 1. The load comes from the vehicle body 6 exerting forces on the tyres during movement of the vehicle 1.

Figure 3:
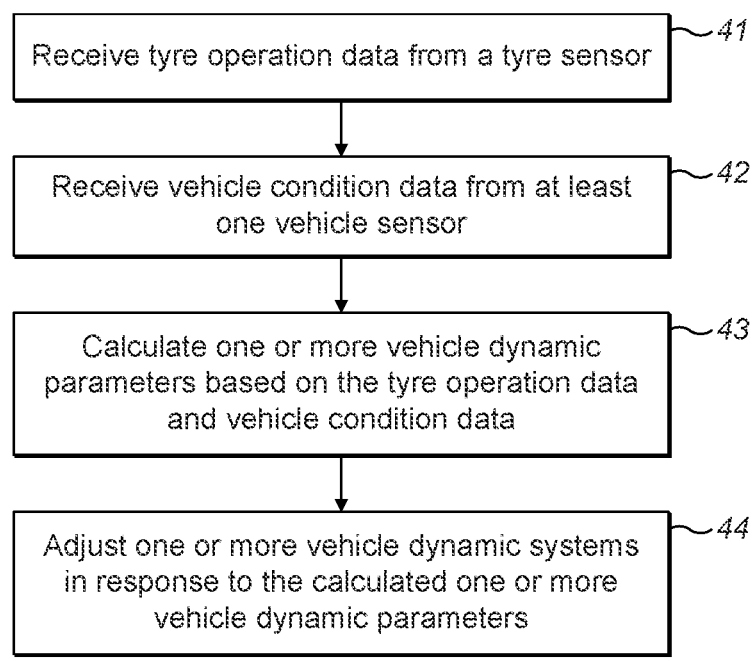
FIG. 3 shows a flowchart of a method for adjusting one or more vehicle dynamics systems.

The tyre operational data can be used by the VCU 22 to improve the control of one or more vehicle dynamics systems within the vehicle 1, Such an improved method for adjusting one or more vehicle dynamics systems of the vehicle 1 that may be implemented by a VCU 22 will now be explained with reference to FIG. 3. FIG. 3 shows a flowchart of such an improved method.

As shown at 41, tyre operation data is received from the tyre sensor. As described herein, the tyre operation data is received by the VCU 22 via the tyre sensor receiver 27. The tyre sensor receiver 27 may process the tyre operation data sent by the tyre sensor to put the tyre operation data in a form that is suitable for the VCU 22 to operate on. In normal operation, the tyre operation data is sent periodically to the VCU 22. Thus, the VCU 22 receives updated tyre operation data over time. The frequency of the sending of the tyre operation data may be such that it is in effect streamed to the VCU 22. I.e. the period between each update is short. The tyre operation data that is received by the VCU 22 may be any of the types of tyre operation data described herein. Some types of tyre operation data may be more static than others which are more variable. In this case some of the tyre operation data may be provided to the VCU 22 with a higher frequency than other types of tyre operation data. For instance, the tyre identifier may only need to be sent when the vehicle starts up, whereas the contact patch longitudinal load may be streamed to the VCU 22.

As shown at 42, vehicle condition data is received from at least one vehicle sensor. As described herein, the VCU 22 is connected to one or more vehicle sensors to each provide vehicle condition data. In normal operation, the vehicle condition data is sent periodically to the VCU 22. Thus, the VCU 22 receives updated vehicle condition data over time. The frequency of the sending of the vehicle condition data by a particular sensor may be such that it is in effect streamed to the VCU 22. I.e. the period between each update is short. The vehicle condition data that is received by the VCU 22 may be any of the types of vehicle condition data described herein. Some types of vehicle condition data may be more static than others which are more variable. In this case some of the vehicle condition data may be provided to the VCU 22 with a higher frequency than other types of vehicle condition data. For instance, the current gear selected by the gearbox may only need to be sent when the vehicle changes gear, whereas the engine revolution speed may be streamed to the VCU 22.

As shown at 43, one or more vehicle dynamics parameters are calculated based on the vehicle condition data and the tyre operation data. Vehicle dynamics parameters describe the current motion state of the vehicle. One or more vehicle dynamics parameters may be calculated based on the vehicle condition data, historic vehicle condition data and the tyre operation data. Historic vehicle condition data being stored vehicle condition data that was generated at least one previous point in time.

The vehicle dynamics parameters can be calculated based on a model of the vehicle. The model of the vehicle describes the operation of the vehicle components over the operational range of the vehicle components. The model may have replaceable elements depending on the components that are fitted to the vehicle 1. For instance, a tyre element of the model may be selected based on the tyre identifier. The tyre identifier being provided as part of the tyre operation data. The model of the vehicle permits calculation of the current motion state of the vehicle by using the tyre operation data and vehicle condition data as inputs to predict the current motion state of the vehicle 1. As described with reference to 44, the vehicle dynamics parameters that are calculated can be used to adjust one or more vehicle dynamics systems to enable optimal control of the vehicle 1 at a given moment.

The vehicle dynamics parameters that are calculated may comprise one or more of the following:

A sideslip angle. The sideslip angle is the angle between a steering heading which is the direction the vehicle should be travelling in based on a steering angle of the vehicle and an actual heading which is the direction the vehicle is calculated as actually travelling in. The sideslip angle indicates a potential loss of traction of at least one of the wheels 2, 3. The sideslip angle may be calculated based on one or more of the contact patch longitudinal load, contact patch deflection, vehicle condition data describing a load on the body of the vehicle, and vehicle condition data describing a dynamic state of the body of the vehicle. The sideslip angle may be calculated based on the contact patch longitudinal load, contact patch deflection, and vehicle condition data describing a load on the body of the vehicle. The sideslip angle may be calculated based on the contact patch longitudinal load, contact patch deflection, vehicle condition data describing a load on the body of the vehicle and vehicle condition data describing a dynamic state of the body of the vehicle.

A current vehicle speed. The vehicle speed is the speed at which the vehicle is travelling over the running surface that supports the wheels of the vehicle 1. The vehicle speed may be calculated based on one or more of vehicle condition data that indicates the current wheel speed of the wheel and the tyre identifier.

A maximum road friction coefficient. The maximum road friction coefficient describes the interaction between the tyre and the running surface. The maximum road friction coefficient indicates the maximum amount of force the tyre can exert on the running surface before slipping on the running surface. The maximum road friction coefficient can be altered depending on the material of the running surface, the moisture level on the running surface, the material that the tyre is composed of. The maximum road friction coefficient may be calculated based on one or more of vehicle condition data that indicates the current wheel speed of the wheel, the contact patch longitudinal load, the contact patch radial load, and the contact patch deflection. A maximum road friction coefficient per wheel may be calculated and then the lowest overall coefficient may be selected as the maximum road friction coefficient. Alternatively, a maximum road friction coefficient may be calculated and provided per wheel.

An aerodynamic load. The aerodynamic load describes the loading on the vehicle body from the interaction of the vehicle body with the surrounding air. The aerodynamic load may be generated based on aerodynamic features of the vehicle 1 such as wings or flaps. The aerodynamic load may also be generated based on the shape of the vehicle body 6. The aerodynamic load quantifies the amount of downwards force being exerted on the vehicle by the interaction of the vehicle with surrounding airflow. The aerodynamic load may be calculated based on one or more of vehicle condition data describing the load on the body of the vehicle from the body force sensor, contact patch radial load, and contact patch longitudinal load.

As shown in 44, one or more vehicle dynamics systems are adjusted in response to the calculated one or more vehicle dynamics parameters. The one or more vehicle dynamics systems may be adjusted in response to historic vehicle dynamics parameters. Historic vehicle dynamics parameters being stored vehicle dynamics parameters that were generated at least one previous point in time. The adjustment of the vehicle dynamics systems can be more accurately controlled because the VCU 22 obtains data from the tyre sensors together with the vehicle sensors and uses the combination of this data which has produced the vehicle dynamics parameters to then control the vehicle dynamics systems. The VCU 22 may adjust one or more of the vehicle ride height system, stability control system, torque vectoring control system, active aero control system, and traction control system based on the calculated one or more vehicle dynamics parameters.

The vehicle ride height system may be adjusted to change a ride height of the vehicle based on the calculated aerodynamic load. For instance, if a high aerodynamic load is calculated then the ride height of the vehicle may be corrected. A high aerodynamic load may mean that the suspension is compressed which would lead to a reduction in the ride height of the vehicle 1. Therefore, the vehicle ride height system may be adjusted to increase the ride height of the vehicle. Alternatively, a high aerodynamic load may mean that is advantageous to lower the ride height of the vehicle, A high aerodynamic load may be determined by the aerodynamic load being above a threshold aerodynamic load. Therefore, the vehicle ride height system may be adjusted to lower the ride height of the vehicle. If a low aerodynamic load is calculated then the ride height of the vehicle may be corrected. A low aerodynamic load may mean that the suspension is extended which would lead to an increase in the ride height of the vehicle 1. Therefore, the vehicle ride height system may be adjusted to lower the ride height of the vehicle. Alternatively, a low aerodynamic load may mean that is advantageous to raise the ride height of the vehicle. A low aerodynamic load may be determined by the aerodynamic load being below a threshold aerodynamic load. Therefore, the vehicle ride height system may be adjusted to raise the ride height of the vehicle.

The stability control system may be adjusted to counter movement of the body of the vehicle 1. For instance, the stability control system may be adjusted when a non-zero sideslip angle is calculated to counter vehicle roll. The stability control system may be adjusted to cause at least some of the controllable linkages in the suspension system to increase the amount of resistance provided to the suspension system to counter vehicle roll.

The torque vectoring control system may be adjusted in response to one or more of the calculated maximum road friction coefficient, current vehicle speed and sideslip angle. The torque vectoring control system may be adjusted to cause a steering effect using torque vectoring. The torque vectoring control system may be adjusted to cause a steering effect using torque vectoring to counter a sideslip angle. For instance, the torque vectoring control system may be adjusted to steer against the sideslip angle to reduce the sideslip angle. The torque vectoring control system may be adjusted to based on the current vehicle speed. For instance, the torque vectoring control system may be adjusted to provide less torque vectoring at high speed and more torque vectoring at low speeds. The torque vectoring control system may be adjusted to based on the calculated maximum road friction coefficient. For instance, the torque vectoring control system may be adjusted to provide less torque vectoring if the calculated maximum road friction coefficient is low and more torque vectoring if the calculated maximum road friction coefficient is high. The torque vectoring control system may be adjusted based on a combination of these factors.

The active aero control system may be adjusted based on the aerodynamic load and/or current vehicle speed. The active aero control system may be adjusted to change downforce provided by active aerodynamic devices 29, 30 based on the aerodynamic load and/or current vehicle speed. The active aero control system may be adjusted to reduce downforce provided by active aerodynamic devices 29, 30 based on the aerodynamic load and/or current vehicle speed. For instance, the active aero control system may be adjusted to reduce downforce provided by active aerodynamic devices 29, 30 based on the current vehicle speed being high. The downforce provided by active aerodynamic device 29, 30 may be reduced once the current vehicle speed is above a threshold vehicle speed. The active aero control system may be adjusted to reduce downforce provided by active aerodynamic devices 29, 30 based on the aerodynamic load being high. The downforce provided by active aerodynamic device 29, 30 may be reduced once the aerodynamic load is above a threshold aerodynamic load. Both of these options may help to reduce drag at high speed.

The traction control system may be adjusted based on the maximum road friction coefficient and/or current vehicle speed. A maximum tyre grip level may be calculated based on the maximum road friction coefficient. A respective maximum tyre grip level may be calculated for each wheel. The traction control system may be adjusted based on the maximum road friction coefficient and/or current vehicle speed to control a torque provided to a wheel to be at or below the maximum tyre grip level.

Tyre parameter accuracy is fundamental in determining the contact forces. In one example, the maximum tyre grip estimation may be accomplished by extending a nonlinear vehicle model in the time update of the unscented Kalman filter with an additional state-space equation with a new variable. In this case, the new variable may be an estimated parameter, which is described by a random walk model. The random walk model is a stationary process only driven by corresponding process noise. The maximum tyre grip level may be integrated in to a tyre model as a scaling parameter of the maximum longitudinal and lateral forces on the wheel ij in pure longitudinal and lateral slip conditions:

$$D_{xij}=F_{zij}[p_{Dx1}+p_{Dx2}df_{zij}][1-p_{Dx3}\gamma_{xij}^2]\lambda_{\mu x}\mu_{max}$$

$$D_{yij}=F_{zij}[p_{Dy1}+p_{Dy2}df_{zij}][1-p_{Dy3}\gamma_{yij}^2]\lambda_{\mu y}\mu_{max}$$

Where $df_{zij}$ is the normalised vertical load of the wheel ij; $p_{Dxn}$ and $p_{Dyn}$ with n=1, . . . , 3 are the shape factors in pure slip conditions; the terms $\gamma_{xij}$ and $\gamma_{yij}$ are linear functions of the camber angle of the respective wheel; $\lambda_{\mu x}$ and $\lambda_{\mu y}$ are the scale factors of the friction coefficient in pure longitudinal and lateral slip conditions. The dynamics of the peak tyre-road friction factor are described by $\dot{\mu}_{max}=0$, which, in discretised form, becomes;

$$\mu_{max,k}=\mu_{max,k-1}+w_{\mu_{max},k-1}$$

where k is the discretisation step, and $w_{\mu_{max},k-1}$ is the associated process noise. The purpose of the μmax estimation is to enhance the estimation of the main filter outputs, e.g. vehicle speed, sideslip angle, and lateral tyre forces, rather than achieving an accurate friction estimation. In this respect, μmax constitutes an additional degree of freedom, which increases the vehicle model robustness by scaling the tyre-road friction coefficient in a Pacejka tyre model formulation.

The system and methods described herein use data provided from vehicle sensors together with data provided from tyre sensors to provide a better estimate of the current state of the vehicle. This better estimate permits more accurate control of various vehicle dynamics system to achieve closer to optimum performance of the vehicle 1. By combining tyre contact forces, that are received from the tyre sensor with the signals obtained from conventional vehicle sensors as described herein improves the estimation accuracy of the states used by the vehicle dynamics controllers (e.g. the VCU). One or more vehicle dynamics systems of the vehicle can then be adjusted through the inclusion of the vertical and longitudinal tyre contact force signals, obtained through smart tyres that have the tyre sensors, to an unscented Kalman filter for vehicle speed and sideslip angle estimation, based on a nonlinear vehicle dynamics model. This significantly enhances the robustness and adaptability of the estimations for typical variations of vehicle and tyre parameters.

The experimental results show that using data from the tyre sensors brings major improvements in terms of: (i) convergence of the estimated tyre-road friction factor to its correct value, which allows reliable sideslip angle and vehicle speed estimation also when the filter is initialised with significant errors with respect to the actual friction conditions; and (ii) state estimation performance during extreme transient manoeuvres at the limit and beyond the limit of handling, in which the filter without smart tyre information shows the typical limitations of state estimators based on vehicle dynamics models.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for adjusting one or more vehicle dynamics systems of a vehicle, the vehicle comprising a road wheel and at least one vehicle sensor configured to provide vehicle condition data, the road wheel comprising a tyre sensor configured to output tyre operation data, the method comprising:
receiving tyre operation data from the tyre sensor;
receiving vehicle condition data from at least one vehicle sensor;
calculating one or more vehicle dynamics parameters based on the vehicle condition data, historic vehicle condition data, and the tyre operation data; and
adjusting one or more vehicle dynamics systems in response to the calculated one or more vehicle dynamics parameters.

2. The method according to claim 1, wherein the tyre operation data comprises contact patch longitudinal load.

3. The method according to claim 1, wherein the tyre operation data comprises contact patch radial load.

4. The method according to claim 1, wherein the tyre operation data comprises a tyre identifier.

5. The method according to claim 1, wherein the tyre operation data comprises contact patch deflection.

6. The method according to claim 1, wherein adjusting one or more vehicle dynamics systems in response to the calculated one or more vehicle dynamics parameters comprises adjusting one or more vehicle dynamics systems in response to the calculated one or more vehicle dynamics parameters and historic vehicle dynamics parameters.

7. The method according to claim 1, wherein the vehicle dynamics systems comprise a vehicle ride height system and adjusting one or more vehicle dynamics systems comprises adjusting the vehicle ride height system to change a ride height of the vehicle.

8. The method according to claim 1, wherein the tyre operation data comprises contact patch longitudinal load; wherein the tyre operation data comprises contact patch radial load; and wherein calculating one or more vehicle dynamics parameters comprises calculating an aerodynamic load of the vehicle based on the contact patch longitudinal load and contact patch radial load; and the vehicle dynamics systems comprise a vehicle ride height system and adjusting one or more vehicle dynamics systems comprises adjusting the vehicle ride height system to change a ride height of the vehicle based on the aerodynamic load.

9. The method according to claim 1, wherein the vehicle dynamics systems comprise a stability control system, and adjusting one or more vehicle dynamics systems comprises adjusting the stability control system to cause at least some controllable linkages in a suspension system of the vehicle to operate to counter vehicle roll.

10. The method according to claim 1, wherein the tyre operation data comprises contact patch longitudinal load; wherein the tyre operation data comprises contact patch deflection; and wherein the vehicle condition data describes a load on the body of the vehicle; calculating one or more vehicle dynamics parameters comprises calculating a sideslip angle based on the contact patch longitudinal load, contact patch deflection and the vehicle condition data; and the vehicle dynamics systems comprise a stability control system, and adjusting one or more dynamics systems comprises adjusting the stability control system to cause at least some controllable linkages in a suspension system of the vehicle to operate to counter vehicle roll based on the side slip angle.

11. The method according to claim 1, wherein the vehicle dynamics systems comprise a torque vectoring control system, and adjusting one or more dynamics systems comprises adjusting the torque vectoring control system to cause a steering effect using torque vectoring.

12. The method according to claim 1, wherein the tyre operation data comprises contact patch longitudinal load; wherein the tyre operation data comprises contact patch deflection; and wherein the vehicle condition data describes a load on the body of the vehicle; calculating one or more vehicle dynamics parameters comprises calculating a sideslip angle based on the contact patch longitudinal load, contact patch deflection and the vehicle condition data; the vehicle dynamics systems comprise a torque vectoring control system; and adjusting one or more dynamics systems comprises adjusting the torque vectoring control system to cause a steering effect using torque vectoring to counter the sideslip angle.

13. The method according to claim 1, wherein the tyre operation data comprises a tyre identifier; and wherein the vehicle condition data indicates a current wheel speed of the wheel; calculating one or more vehicle dynamics parameters comprises calculating a current vehicle speed based on the vehicle condition data that indicates the current wheel speed of the wheel and the tyre identifier; the vehicle dynamics systems comprise a torque vectoring control system; and adjusting one or more dynamics systems comprises adjusting the torque vectoring control system based on the current vehicle speed.

14. The method according to claim 1, wherein the tyre operation data comprises contact patch longitudinal load; wherein the tyre operation data comprises a tyre identifier; wherein the tyre operation data comprises contact patch deflection; and wherein the vehicle condition data indicates a current wheel speed of the wheel; calculating one or more vehicle dynamics parameters comprises calculating a maximum road friction coefficient based on the vehicle condition data that indicates the current wheel speed of the wheel, the contact patch longitudinal load, the contact patch radial load, and the contact patch deflection; the vehicle dynamics systems comprise a torque vectoring control system; and adjusting one or more dynamics systems comprises adjusting the torque vectoring control system based on the maximum road friction coefficient.

15. The method according to claim 1, wherein the vehicle dynamics systems comprise an active aero control system; and adjusting one or more vehicle dynamics systems comprises adjusting the active aero control system to change downforce provided by active aerodynamic devices.

16. The method according to claim 1, wherein the tyre operation data comprises a tyre identifier; and wherein the vehicle condition data indicates a current wheel speed of the wheel; calculating one or more vehicle dynamics parameters comprises calculating a current vehicle speed based on the vehicle condition data that indicates the current wheel speed of the wheel and the tyre identifier and calculating an aerodynamic load of the vehicle based on the contact patch longitudinal load and contact patch radial load; the vehicle dynamics systems comprise an active aero control system; and adjusting one or more dynamics systems comprises adjusting the active aero control system based on the current vehicle speed and the tyre identifier.

17. The method according to claim 1, wherein the vehicle dynamics systems comprise a traction control system; and adjusting one or more vehicle dynamics systems comprises adjusting the traction control system to control a torque provided to the wheel.

18. The method according to claim 1, wherein the tyre operation data comprises contact patch longitudinal load; wherein the tyre operation data comprises a tyre identifier; wherein the tyre operation data comprises contact patch deflection; and wherein the vehicle condition data indicates a current wheel speed of the wheel; calculating one or more vehicle dynamics parameters comprises calculating a maximum road friction coefficient based on the vehicle condition data that indicates the current wheel speed of the wheel, the contact patch longitudinal load, the contact patch radial load, and the contact patch deflection; calculating one or more vehicle dynamics parameters comprises calculating a current vehicle speed based on the vehicle condition data that indicates the current wheel speed of the wheel and the tyre identifier; the vehicle dynamics systems comprise a traction control system; and adjusting one or more vehicle dynamics systems comprises adjusting the traction control system based on the maximum road friction coefficient and current vehicle speed to control a torque provided to the wheel.

19. The method according to claim 1, wherein the tyre operation data comprises contact patch longitudinal load; the tyre operation data comprises contact patch radial load; the tyre operation data comprises a tyre identifier; and the tyre operation data comprises contact patch deflection.

20. The method according to claim 1, the historic vehicle condition data being stored vehicle condition data, and the stored vehicle condition data being generated during at least one previous point in time.

21. The method according to claim 1, wherein the historic vehicle condition data comprises data indicative of (i) a previous load on the body of the vehicle or (ii) a previous wheel speed of the wheel.

* * * * *